(12) United States Patent
Suda

(10) Patent No.: US 7,746,403 B2
(45) Date of Patent: Jun. 29, 2010

(54) IMAGE CAPTURING APPARATUS HAVING A PLURALITY OF FOCUS DETENTION DEVICES AND CONTROL METHOD THEREFOR

(75) Inventor: Hirofumi Suda, Yokohama (JP)

(73) Assignee: Canon Kabushiki Kaish, Tokyo (JP)

( * ) Notice: Subject to any disclaimer, the term of this patent is extended or adjusted under 35 U.S.C. 154(b) by 1127 days.

(21) Appl. No.: 11/227,611

(22) Filed: Sep. 14, 2005

(65) Prior Publication Data

US 2006/0061676 A1    Mar. 23, 2006

(30) Foreign Application Priority Data

Sep. 17, 2004   (JP) ............................. 2004-271718

(51) Int. Cl.
*G03B 13/00* (2006.01)
*H04N 5/232* (2006.01)

(52) U.S. Cl. ...................... 348/345; 348/348; 348/353; 348/356

(58) Field of Classification Search ................. 348/345, 348/348, 349, 350, 353, 354, 356; 396/104
See application file for complete search history.

(56) References Cited

U.S. PATENT DOCUMENTS

| 4,412,253 | A | * | 10/1983 | Oguino ........................ 348/623 |
| 5,815,748 | A | * | 9/1998 | Hamamura et al. ......... 396/104 |
| 6,130,417 | A | * | 10/2000 | Hashimoto ............... 250/201.2 |
| 7,058,294 | B2 | * | 6/2006 | Nakahara .................... 396/104 |
| 2002/0154909 | A1 | * | 10/2002 | Yamazaki et al. ........... 396/125 |
| 2005/0031330 | A1 | * | 2/2005 | Nonaka et al. .............. 396/104 |

FOREIGN PATENT DOCUMENTS

| JP | 03-081713 | 4/1991 |
| JP | 2001-141984 | 5/2001 |
| JP | 2001-264622 | 9/2001 |

\* cited by examiner

*Primary Examiner*—Sinh Tran
*Assistant Examiner*—Albert H Cutler
(74) *Attorney, Agent, or Firm*—Cowan, Liebowitz & Latman, P.C.

(57) ABSTRACT

This invention allows focus detection devices to be smoothly and quickly switched even if different image capturing frame counts or image capturing field counts are set in accordance with image capturing purposes. An AF system selection unit switches focus detection methods based on a direct distance measurement AF unit and captured signal AF detection unit in accordance with the frame count or field count of a captured signal.

9 Claims, 12 Drawing Sheets

FIG. 6
☐ NORMAL IMAGE CAPTURING (FRAME RATE: 60I OR 60P)
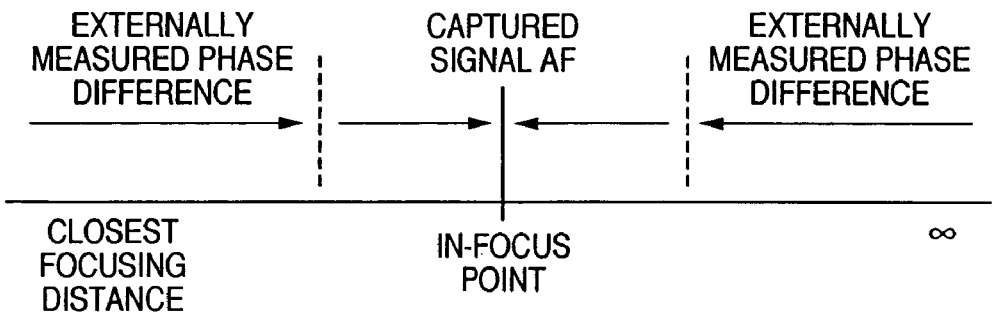
☐ LOW-SPEED IMAGE CAPTURING
(FRAME RATE: 30P, 24P, OR SLOW-SHUTTER IMAGE CAPTURING)
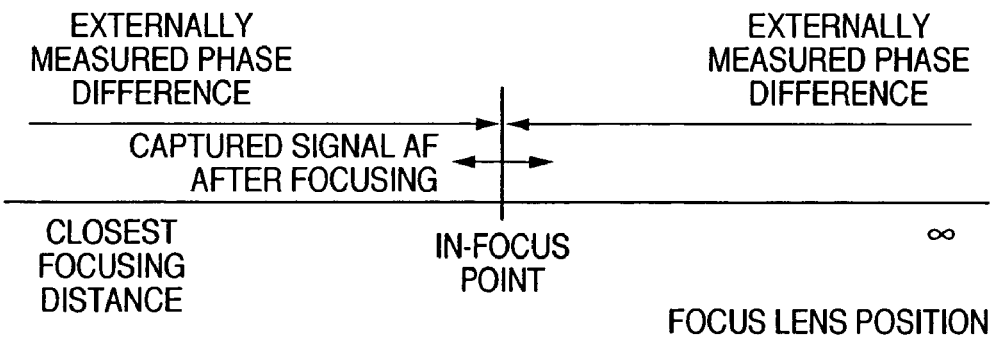
FOCUS LENS POSITION

FIG. 8
☐ NORMAL IMAGE CAPTURING (FRAME RATE: 60I OR 60P)
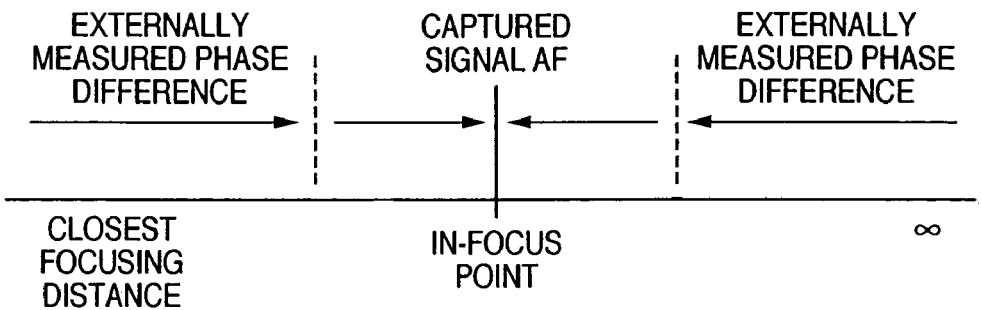
☐ LOW-SPEED IMAGE CAPTURING
 (FRAME RATE: 30P, 24P, OR SLOW-SHUTTER IMAGE CAPTURING)
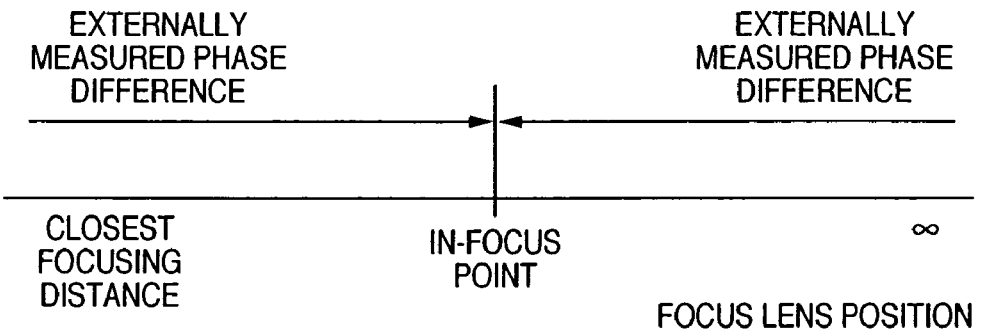

IMAGE CAPTURING APPARATUS HAVING A PLURALITY OF FOCUS DETENTION DEVICES AND CONTROL METHOD THEREFOR

FIELD OF THE INVENTION

The present invention relates to an image capturing apparatus having an automatic focus detection function and a control method therefor.

BACKGROUND OF THE INVENTION

Conventionally, a TTL autofocus (to be referred to as AF hereinafter) system has been proposed, in which a high frequency component is extracted from a captured signal, a search is then made for a place where it is maximized (the top of a hill), and the place is determined as an in-focus point. AF based on this system will be referred to as captured signal AF hereinafter.

According to the characteristic features of this system, it requires no mechanical members or the like for automatic focus detection, and hence can be implemented at a low cost. In addition, since focus determination is performed by using a captured signal itself, the system is accurate, free from deterioration with time, and the like. Captured signal AF which is free from the influence of deterioration of mechanical members with time is very effective for image capturing operation by a high-pixel count image capturing device because it requires severe focusing accuracy.

In this system, in order to discriminate the top of a hill, i.e., an in-focus point, the entire region is scanned from end to end to comprehend its shape or so-called hill-climbing operation is performed. Comprehending the shape of a hill by scanning makes the operator see in-focus and out-of-focus events. This operation is therefore inappropriate for a state wherein moving images are captured or previewed on a monitor. Hill-climbing operation is often used for moving image capturing or monitor previewing operation. When, however, this operation starts from a lens position distant from an in-focus point, it starts from a flat portion of a hill. It is therefore difficult to discriminate the direction of the top of the hill. If a mistake is made on the direction of the top of the hill, awkward operation occurs, for example, a search goes to an end opposite to the top of the hill and then returns. In addition, it takes much time to achieve focusing.

Since autofocus based on TTL or a direct distance measurement system (to be referred to as direct distance measurement AF hereinafter), which uses an infrared triangular distance measurement system or pupil division phase difference detection system, can directly measure a distance, scanning operation or hill-climbing operation is not required to detect the position of a in-focus point. This technique allows fast discrimination of an in-focus point. However, the technique requires mechanical members and the like for automatic focus detection, and distance measurement is performed by using a system different from the image capturing system, and hence has the drawbacks of being vulnerable to a shift in in-focus position due to deterioration with time or temperature, causing parallax in a captured image and distance measurement position in accordance with the distance, and the like. When the technique is applied to a high-pixel count image capturing device, in particular, a shift in in-focus position due to deterioration with time or temperature may sometimes lead to critical blurring.

As a means which improves AF performance, hybrid AF has been proposed, which is obtained by combining captured image AF and direct distance measurement AF to realize fast, accurate autofocus by combining the merits of the two AF systems. As a selection method for these two AF systems, a system of switching from external distance measurement AF to captured signal AF in response to the operation of an image capturing switch has been proposed (see, e.g., Japanese Patent Laid-Open No. 2001-264622).

This system is suitable for still image capturing operation but is not suitable for moving image capturing operation of sequentially changing objects to be image-captured in accordance with panning and the like without operation of the image capturing switch. In addition, there has been proposed a method in which in-focus positions are detected by using the two systems, and when the measurement results obtained by the two systems differ by a predetermined amount upon comparison, one of the systems is selected in accordance with a condition (see Japanese Patent Laid-Open No. 2001-264622). This system is, however, based on the system of performing scanning in advance to detect an in-focus position, and is not suitable for AF for moving images. This is because scanning operation is noticeable, and undesirable images are obtained.

There has also been proposed a technique of driving a lens toward the front-focused/rear-focused position by a predetermined amount by direct measurement AF, then switching to captured signal AF, and if contrast detection cannot be done after switching, switching again to direct measurement AF (see Japanese Patent Laid-Open No. 2001-141984).

There has further been proposed a technique of performing direction discrimination/motor speed control by the phase difference system if the focus has greatly shifted, and performing AF by captured image AF if a high frequency component is detected (see Japanese Patent Laid-Open No. 3-81713).

Since the TV systems are limited to NTSC, PAL, and the like, conventional digital video cameras designed to capture moving images generally perform interlaced image capturing (60I) at a rate of almost 60 fields per sec according to the NTSC system, and perform interlaced image capturing (50I) at a rate of almost 50 fields per sec according to the PAL system. Image capturing devices are also driven in synchronism with these periods. However, with generalization of TV digital broadcasting, high-definition broadcasting, movie digital image capturing, and the like, digital video cameras have been designed to perform image capturing in various image capturing formats.

With regard to TV broadcasting systems alone, with resolutions of 480i, 480p, 720p, and 1080i, some area is assigned 60 fields/frames, and the other area is assigned 50 fields/frames. Note that in the case of progressive scanning, 60 frames and 30 frames are respectively expressed as 60P and 30P using frame counts. In the case of interlaced scanning, 60 fields and 50 fields are respectively expressed as 60I and 50I using field counts. Consider a case wherein moving images are replayed on a personal computer. Moving images with frame counts less than 30 (e.g., 20P, 15P, and 10P) are generally captured by progressive image capturing. In addition, in consideration of compatibility with film movies, image capturing at a rate of 24 frames per sec, i.e., 24P image capturing, is becoming popular.

High-sensitivity image capturing is performed as image capturing in dark places and the like. In this case, a moving image capturing technique called slow-shutter image capturing is generally performed, in which long-time exposure image capturing is performed by decreasing the field/frame count of an image capturing device to a count smaller than the recording field/frame count. In this case, although the field/ frame count of the image capturing device is decreased for long-time exposure, the field/frame count of a final video signal is kept constant in conformity with a broadcasting system or TV interface.

When conventional captured signal AF is used for moving image capturing, a moving captured signal used for display and recording is generated, and at the same time AF evaluation value is obtained from part of the signal. The amount of obtained information depends on the field count/frame count of a captured image. When the field count/frame count of a captured image is large, smooth focusing operation can be performed. If, however, the field count/frame count is small, the focusing speed decreases, resulting in difficulty in performing smooth focusing operation. In addition, the follow-up speed decreases with respect to a moving object. In the case of captured signal AF for a still image, the frame count can be temporarily increased by changing the driving method for the image capturing device for AF only at the time of AF. However, such a technique cannot be applied to moving image capturing because AF and moving image recording are simultaneously performed.

SUMMARY OF THE INVENTION

It is, therefore, an object of the present invention to smoothly and quickly switch focus detection devices even if different image capturing frame counts or image capturing field counts are set in accordance with image capturing purposes.

In order to solve the above object, according to the first aspect of the present invention, there is provided an image capturing apparatus comprising an image capturing device which outputs a captured signal of an object on the basis of incident light, an output interval control device which variably controls output intervals of captured signals output by the image capturing device per unit time, a plurality of focus detection devices which detect a focus, and a control device which controls focus detection by the plurality of focus detection devices, wherein the control device changes the focus detection methods based on the plurality of focus detection devices, in accordance with the captured signal output intervals controlled by the output interval control device.

According to the second aspect of the present invention, there is provided a control method for an image capturing apparatus including an image capturing device which outputs a captured signal of an object on the basis of incident light, and a plurality of focus detection devices which detect a focus, comprising an output interval control step of variably controlling output intervals of captured signals output by the image capturing device per unit time, and a control step of switching focus detection methods by the plurality of focus detection devices in accordance with captured signal output intervals in the output interval control step.

According to the third aspect of the present invention, there is provided a program characterized by causing a computer to execute the control method for the image capturing apparatus.

According to the fourth aspect of the present invention, there is provided a computer-readable recording medium characterized by recording the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view for explaining the operation of the second embodiment of the present invention;

FIG. 8 is a view for explaining the operation of the third embodiment of the present invention;

DETAILED DESCRIPTION OF THE PREFERRED EMBODIMENTS

Figure 1:
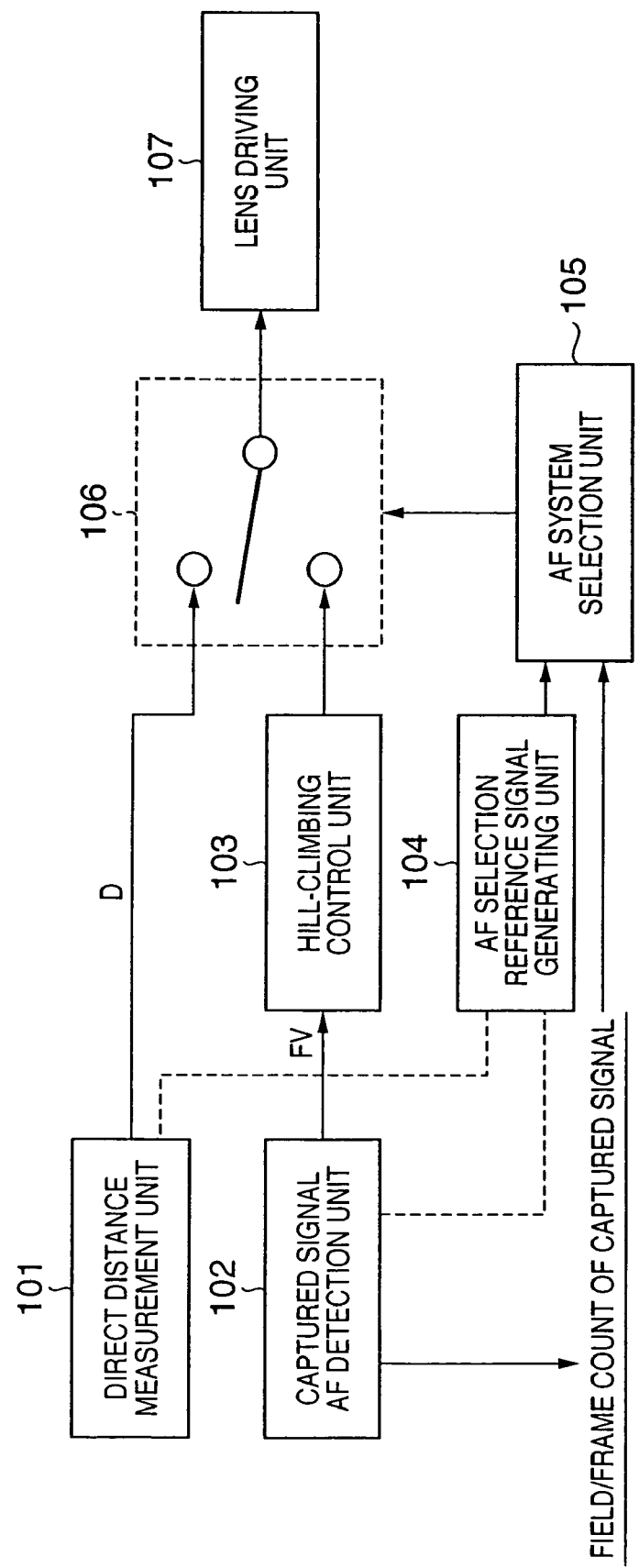
FIG. 1 is a block diagram showing the conceptual arrangement of an embodiment of the present invention.

The preferred embodiments of the present invention will be described in detail below with reference to the accompanying drawings. FIG. 1 is a block diagram showing the conceptual arrangement of the first embodiment of the present invention.

Reference numeral 101 denotes a direct distance measurement unit which outputs a distance signal D as a detection result; 102, a captured signal AF detection unit which outputs an evaluation value FV for captured signal AF; 103, a hill-climbing control unit which performs in-focus point search operation by hill-climbing operation using the evaluation value FV for captured signal AF; 104, an AF selection reference signal generating unit which generates an AF system selection reference signal on the basis of either or both of a distance signal from the direct distance measurement unit 101 and a captured signal AF detection output from the captured signal AF detection unit 102; and 105, an AF system selection unit which determines selection of an AF system on the basis of an AF selection reference signal from the AF selection reference signal generating unit 104 and the frame/field count of a captured signal from the captured signal AF detection unit 102, selects direct distance measurement AF and captured signal AF detection by switching a switch 106, and transfers corresponding information to a lens driving unit 107.

Figure 2:
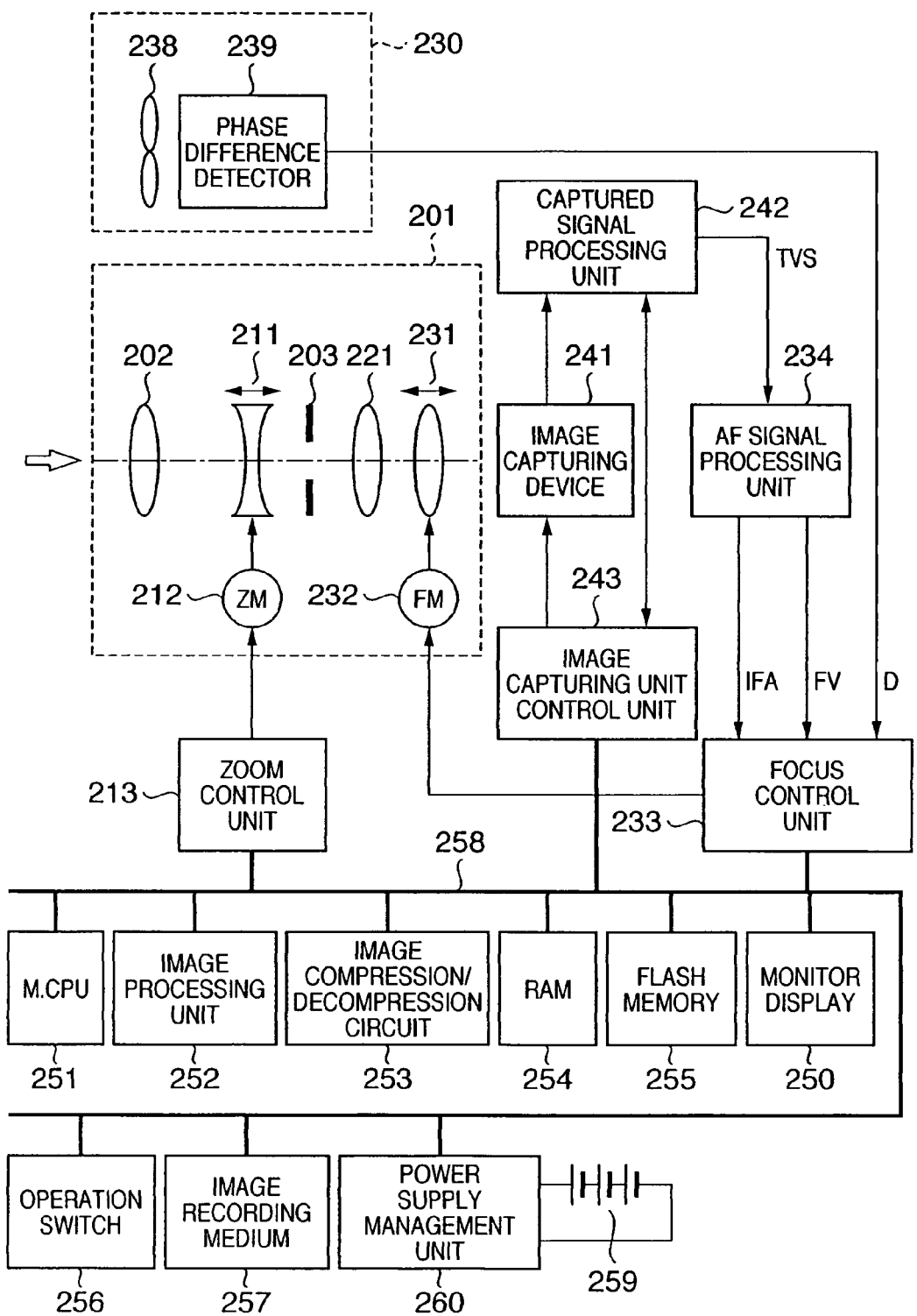
FIG. 2 is a view showing the arrangement of a camera equipped with an automatic focus detection device common to the first to third embodiments of the present invention.

FIG. 2 is a view showing the arrangement of a camera equipped with an automatic focus detection device which is common to the first to third embodiments (to be described later) of the present invention. In this case, the term "camera" is a generic term for a so-called video camera, digital still camera, and the like which capture moving images and still images and record them on various media such as a tape, solid-state memory, optical disk, and magnetic disk. The respective units in the camera are connected to each other through a bus 258 and are configured to be controlled by a main CPU 251.

A lens unit 201 includes a fixed first group lens 202, zoom lens 211, stop 203, fixed third group lens 221, and focus lens 231. An object is image-captured by forming an image on an image capturing device 241 through these optical members.

A zoom control unit 213 drives the zoom lens 211 through a zoom motor 212 in accordance with an instruction from the main CPU 251.

The image formed on the image capturing device 241 is photoelectrically converted by the image capturing device 241 and adjusted as an image signal by a captured signal processing unit 242. In addition, a captured signal TVS is input to an AF signal processing unit 234. The AF signal processing unit 234 generates an FV signal for hill-climbing AF control and an IFA signal representing a focusing degree and inputs them to a focus control unit 233.

An external distance measurement AF detection module 230 calculates the distance signal D with respect to the object by detecting the phase difference amount between two object images formed on a phase difference detector 239 through an external distance measurement AF pupil division optical system 238, and inputs the distance signal D to the focus control unit 233. The focus control unit 233 drives the focus lens 231 through a focus motor 232 on the basis of the external distance measurement AF distance signal D and captured signal AF evaluation value FV/focusing degree IFA, thereby realizing autofocus (AF).

The image signal adjusted by the captured signal processing unit 242 is temporarily stored in a RAM 254. The image signal stored in the RAM 254 is compressed by an image compression/decompression circuit 253 and recorded on an image recording medium 257. Concurrently with this operation, the image signal stored in the RAM 254 is reduced/enlarged to an optimal size by an image processing unit 252 and displayed on a monitor display 250, thereby feeding back the captured image to the operator in real time. In addition, displaying a captured image on the monitor display for a predetermined period time immediately after image capturing operation allows the operator to check the captured image.

An operation switch 256 includes a power switch, zoom switch, release switch, monitor display ON/OFF switch, and the like. The power switch is used to turn on/off the power supply of the camera. The zoom switch is used to issue an instruction to drive the zoom.

The release switch is designed as a two-stroke switch. The first and second stroke switches will be referred to as SW1 and SW2, respectively. In still image capturing operation, SW1 is used to issue an instruction to restore from an image capturing standby state or prepare for the start of image capturing (e.g., an instruction to start autofocus or an instruction to start photometry), and SW2 is used to issue an instruction to perform image capturing and record an image on the image recording medium 257. In the case of moving image capturing operation, SW2 is operated once to start recording, and is operated again in a recording state to stop the recording operation. The monitor display ON/OFF switch is used to, for example, switch between displaying an image in a captured state on the monitor display 250 and not displaying it.

A power supply management unit 260 performs power supply management, i.e., checking the charge state of battery 259 connected to the power supply management unit 260, and charging the battery.

Prior to these operations, when the camera is activated from the OFF state, the program stored in a flash memory 255 is loaded into part of the RAM 254, and a main CPU 251 performs operation in accordance with the program loaded into the RAM 254. The above description is about the arrangement of the camera equipped with the automatic focus detection device.

First Embodiment

The first embodiment of the present invention will be described next.

Figure 3:
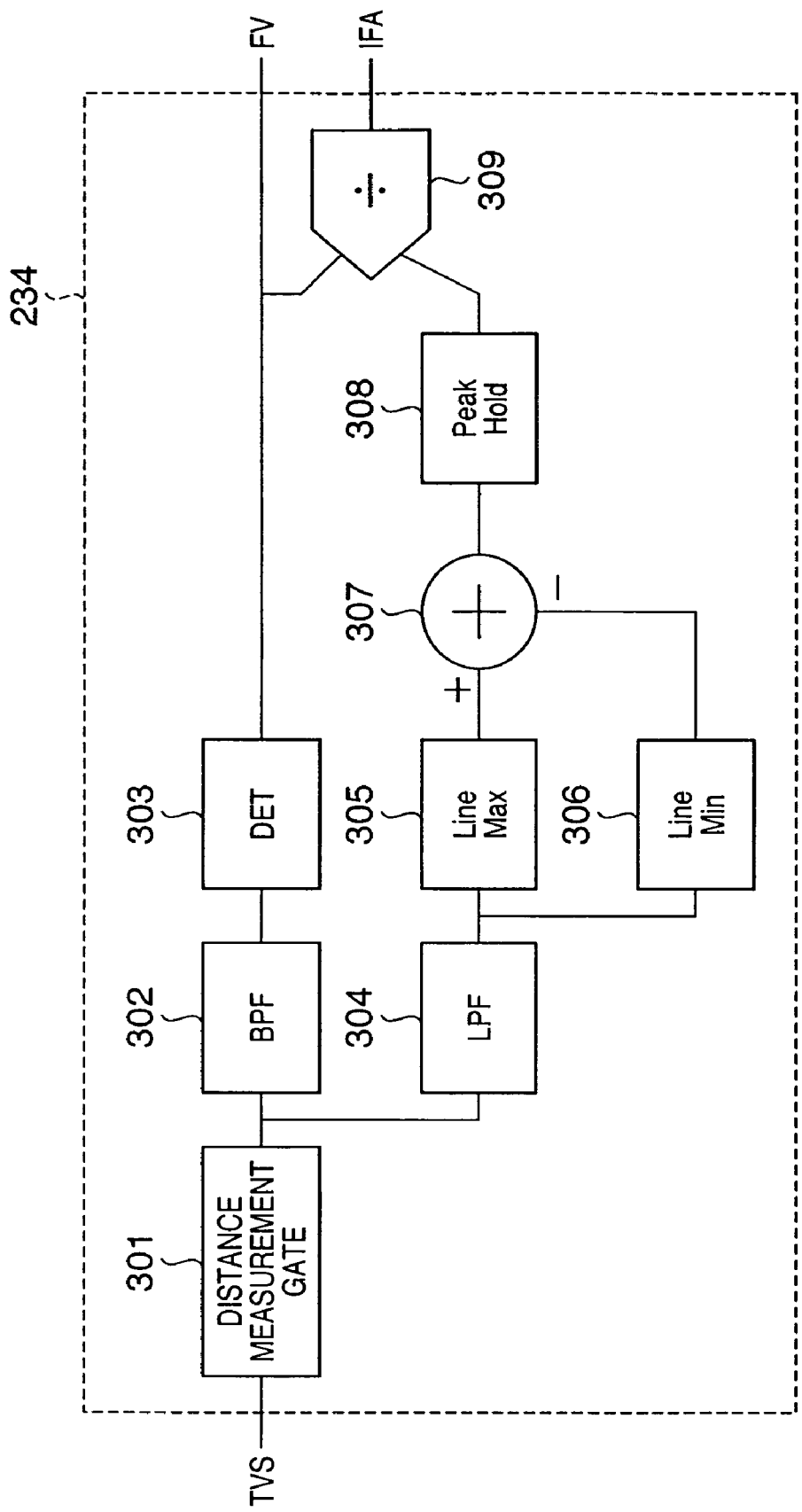
FIG. 3 is a block diagram showing an embodiment of an AF signal processing unit in FIG. 2.

FIG. 3 is a block diagram showing an embodiment of an AF signal processing unit 234 in FIG. 2. One or a plurality of distance measurement gates 301 extract a captured signal from only part of the frame of a captured signal TVS from a captured signal processing unit 242. A bandpass filter (BPF) 302 extracts only a predetermined high frequency component from the captured signal. A detector 303 performs detection processing such as peak holding and integration for the resultant signal to output a captured signal AF evaluation value FV, and outputs it to a focus control unit 233.

A low-pass filter 304 removes a high frequency component from the captured signal TVS passing through the distance measurement gate 301. A line maximum value circuit 305 detects the maximum value of the luminance of one horizontal line. A line minimum value circuit 306 detects the minimum value of the luminance of one horizontal line. An adder 307 calculates the difference (maximum value–minimum value) between the maximum value and minimum value of one horizontal line. A peak hold circuit 308 then detects a peak value MM of (maximum values–minimum values) of all the lines in the distance measurement gate. This value almost corresponds to the maximum value of contrast in the measurement distance gate. A focusing degree IFA for each distance measurement frame is calculated by dividing FV by MM for each distance measurement gate.

If there are a plurality of distance measurement gates 301, a plurality of circuits follow them, and a plurality of captured signal AF evaluation values FV/focusing degrees IFA are obtained. In this case, the focus control unit 233 selects a signal from a plurality of signals in accordance with conditions and performs autofocus operation on the basis of a plurality of signals.

Figure 4:
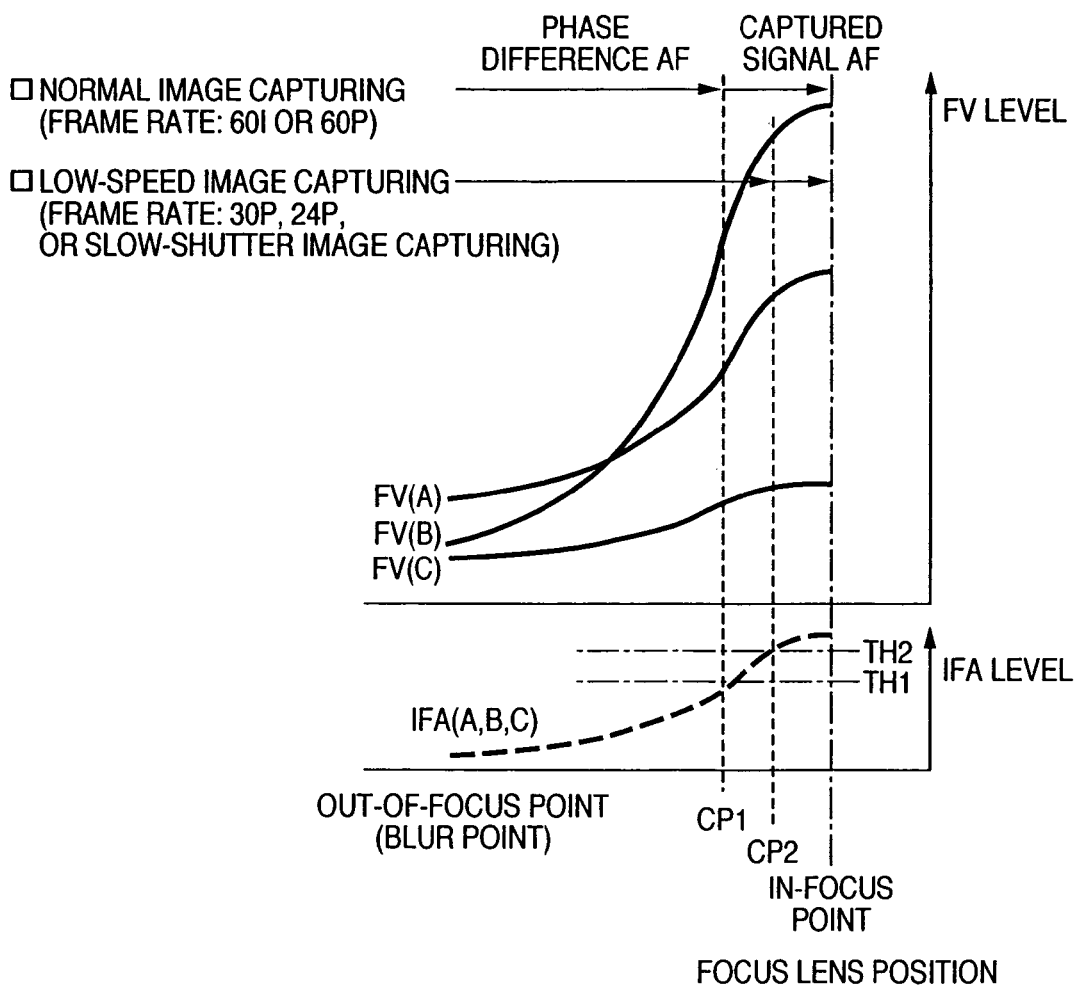
FIG. 4 is a graph for explaining the operation of the first embodiment of the present invention.

FIG. 4 is a graph for explaining the operation of this embodiment.

The captured signal AF evaluation value FV greatly changes in level at an in-focus point in accordance with the type of object and image capturing conditions (object brightness, illuminance, focal length, and the like). Referring to FIG. 4, FV(A) represents changes in signal level as a focus lens 231 is moved from an out-of-focus point (blur point) to an in-focus point when a general object A is image-captured. In contrast, FV(B) represents changes in signal level when a high-contrast object B is image-captured, and FV(C) represents changes in signal level when a low-contrast object or low-illuminance object C is image-captured.

In contrast, focusing degrees IFA with respect to all the objects A, B, and C reach almost the same level at the in-focus point. If, therefore, focusing degree IFA levels are determined with a common threshold with respect to all the objects A, B, and C, similar blurring degrees are determined. Assume that a captured signal is in a normal image capturing state (the frame rate or field rate is about 60/sec). In this case, switching from external distance measurement AF to captured signal AF according to TH1 makes it possible to smoothly switch from phase difference detection AF to captured signal AF always at a position where a similar blurring degree appears, thereby quickly reaching an in-focus point with captured signal AF.

Assume that the frame rate (the number of frames per sec) of a captured signal is low (30P, 24P, slow-shutter image capturing, or the like). In this case, in order to quickly reach an in-focus point, since the control speed in captured signal AF is low, switching operation must be done at a position nearer to the in-focus point. If, therefore, the frame rate is low, TH2 is used to switch from external distance measurement AF to captured signal AF. This makes it possible to smoothly and quickly reach the in-focus point as in the case wherein the frame rate is high.

Figure 5:
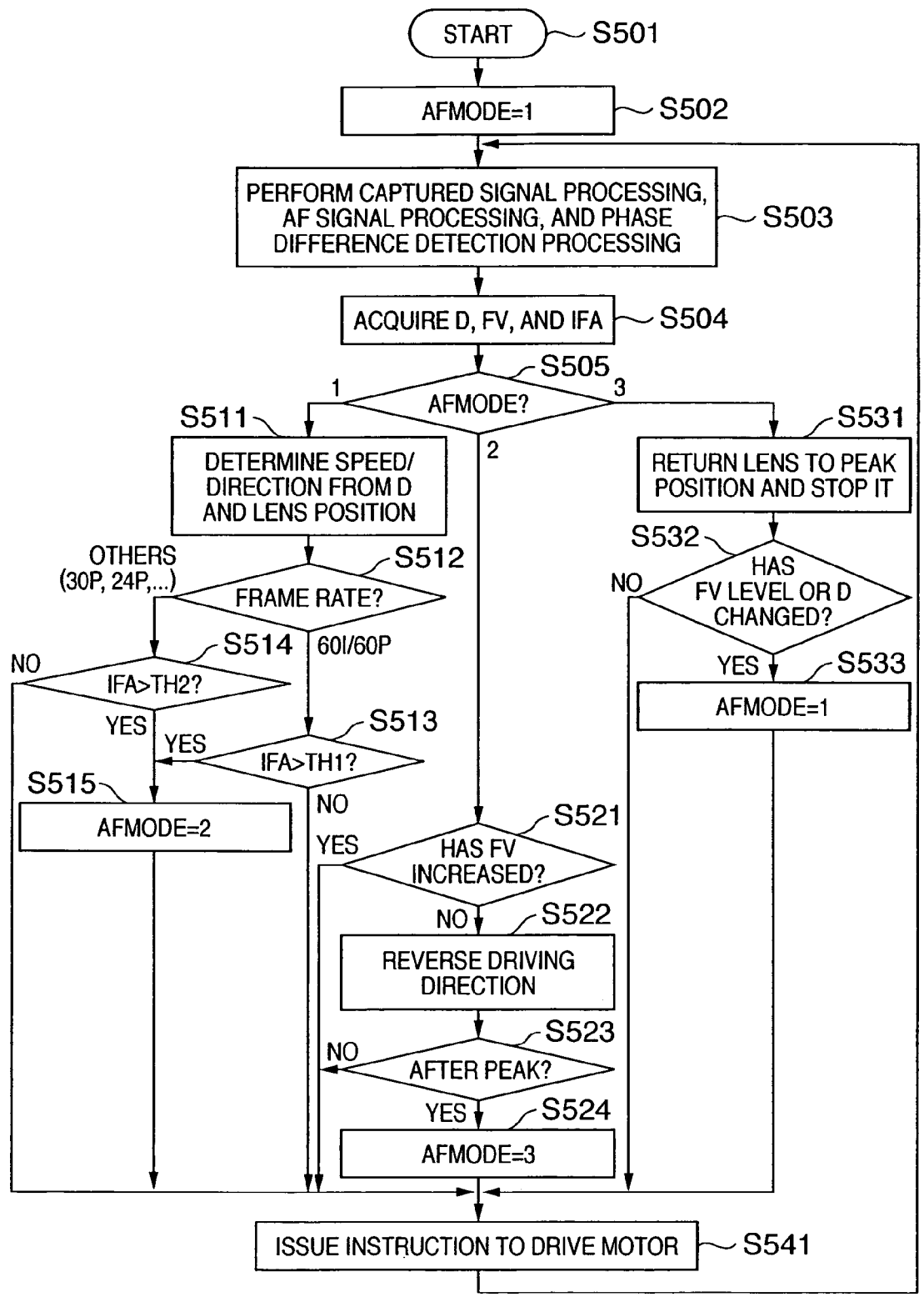
FIG. 5 is a flowchart showing an algorithm in a focus control unit according to the first embodiment of the present invention.

An algorithm in the focus control unit 233 according to this embodiment will be described next with reference to the flowchart of FIG. 5. In step S501, the algorithm is started. In step S502, 1 is assigned to AFMODE representing the state of AF. In step S503, the captured signal processing unit 242, the AF signal processing unit 234, and a phase difference detector 239 synchronously perform captured signal processing, AF signal processing, and phase difference detection processing, respectively.

In step S504, an FV signal and IFV signal are acquired from the AF signal processing unit 234, and a distance signal D is acquired from the phase difference detector 239. The flow branches from step S505 to step S511, S521, or S531 in accordance with AFMODE. At first, since AFMODE is 1, the flow branches to step S511.

In step S511, a lens driving direction and speed are determined on the basis of the distance signal D acquired in step S504 and the current position of the focus lens 231. That is, a direction and speed are determined such that the lens is driven at a high speed if the distance is large in the direction in which the lens approaches the position of the distance signal D, and is driven at a low speed if the distance is small. If the distance signal D coincides with the current lens position, it is determined that lens driving is stopped.

In step S512, the frame rate of the current captured signal is checked. If the frame rate is high, e.g., 60I or 60P, the flow advances to step S513. If the frame rate is low, e.g., 30P, 24P, or slow-shutter image capturing, the flow advances to step S514. In step S513, the IFA level acquired in step S504 is compared with the threshold TH1. If the level is equal to or lower than TH1, the flow advances to step S541. If the level is higher than TH1, since it indicates that the lens is near the in-focus point, 2 is assigned to AFMODE in step S515. The flow then advances to step S541.

In step S541, the lens is driven at the determined motor speed and in the determined direction. The flow then advances to step S503 to subsequently repeat the above processing in synchronism with the read cycle (captured signal processing cycle) of the image capturing device. In step S514, the IFA level acquired in step S504 is compared with the threshold TH2. If the level is equal to or lower than TH2, the flow advances to step S541. If the level is higher than TH2, since it indicates that the lens is located nearer to the in-focus point, 2 is assigned to AFMODE in step S515, and the flow advances to step S541.

If 2 is assigned to AFMODE in step S505, the flow branches to step S521. In step S521, it is determined whether the captured signal AF evaluation value FV acquired in step S504 has increased or decreased (although not written in the algorithm, since this operation is comparing the magnitude of the evaluation value FV with the previous read result from an image capturing device 241, the previous FV value is held).

If it is determined in step S521 that FV has increased, the flow advances to step S541. If NO in step S521, the flow advances to step S522. In step S522, the lens driving direction is reversed. It is determined in step S523 whether the decrease has occurred after the peak of FV. If NO in step S523, the flow advances to step S541. If YES in step S523, the flow advances to step S524.

In step S524, 3 is assigned to AFMODE. If it is determined in step S505 that AFMODE is 3, the flow advances to step S531. In step S531, the lens is returned to the peak position of FV and stopped (focusing). In step S532, it is monitored whether the FV level at the peak position of FV (in-focus position) has changed, and it is also monitored whether the distance signal D has changed from the in-focus position. If no change has occurred, the flow advances to step S541. If a change has occurred, 1 is assigned to AFMODE in step S533. The flow then advances to step S541 (restart).

Second Embodiment

The second embodiment of the present invention will be described next.

FIG. 6 is a view for explaining the operation of the second embodiment of the present invention. In this embodiment, when a captured signal is in a normal image capturing state (the frame rate or field rate is about 60/sec), externally measured phase difference detection is performed up to a predetermined focusing degree, and an in-focus point is detected by captured signal AF near the in-focus point, as already described in the first embodiment. If the frame rate of a captured signal is low (30P, 24P, slow-shutter image capturing, or the like), externally measured phase difference detection is performed first to guide the lens to the in-focus point detected by externally measured phase difference, and an in-focus point is detected again by captured signal AF after focusing is achieved by externally measured phase difference detection.

Figure 7:
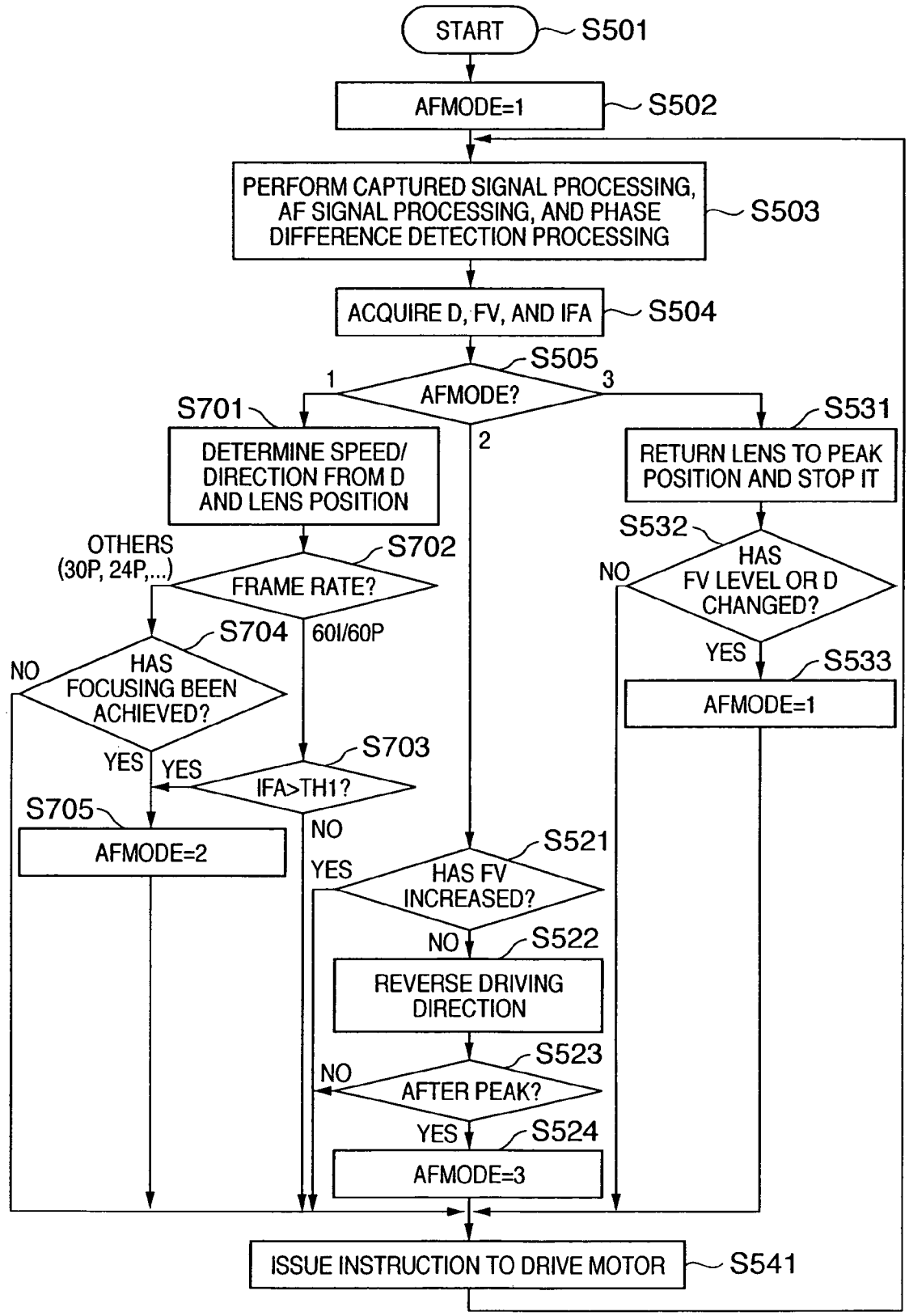
FIG. 7 is a flowchart showing an algorithm in a focus control unit according to the second embodiment of the present invention.

An algorithm in this embodiment will be described next with reference to FIG. 7. Note that the same operations as in FIG. 5 are performed in steps denoted by the same reference numerals as in FIG. 7, and hence a description thereof will be omitted. In step S701, a lens driving direction and speed are determined on the basis of a distance signal D acquired in step S504 and the current position of a focus lens 231. That is, a direction and speed are determined such that the lens is driven at a high speed if the distance is large in the direction in which the lens approaches the position of the distance signal D, and is driven at a low speed if the distance is small. If the distance signal D coincides with the current lens position, it is determined that lens driving is stopped.

In step S702, the frame rate of the current captured signal is checked. If the frame rate is high, e.g., 60I or 60P, the flow advances to step S703. If the frame rate is low, e.g., 30P, 24P, or slow-shutter image capturing, the flow advances to step S704.

In step S703, the IFA level acquired in step S504 is compared with a threshold TH1. If the level is lower than TH1, the flow advances to step S541. If the level is higher than TH1, since it indicates that the lens is near the in-focus point, 2 is assigned to AFMODE in step S705. The flow then advances to step S541.

In step S541, the lens is driven at the determined motor speed and in the determined direction. The flow then advances to step S503 to subsequently repeat the above processing in synchronism with the read cycle (captured signal processing cycle) of the image capturing device. In step S704, it is determined, on the basis of the distance signal D acquired in step S504 and the current position of the focus lens 231, whether focusing is achieved. If focusing is achieved, the flow advances to step S705. If focusing is not achieved, the flow advances to step S541.

Third Embodiment

The third embodiment of the present invention will be described next.

FIG. 8 is a view for explaining the operation of the third embodiment of the present invention. In this embodiment, when a captured signal is in a normal image capturing state (the frame rate or field rate is about 60/sec), externally measured phase difference detection is performed up to a predetermined focusing degree, and an in-focus point is detected by captured signal AF near the in-focus point, as already described in the first embodiment. If the frame rate of a captured signal is extremely low (slow-shutter image capturing, 30P, 24P, 15P, 10P, 5P, or the like), the lens is guided to the in-focus point detected by an externally measured phase difference by performing only externally measured phase difference detection, thereby achieving focusing.

Figure 9:
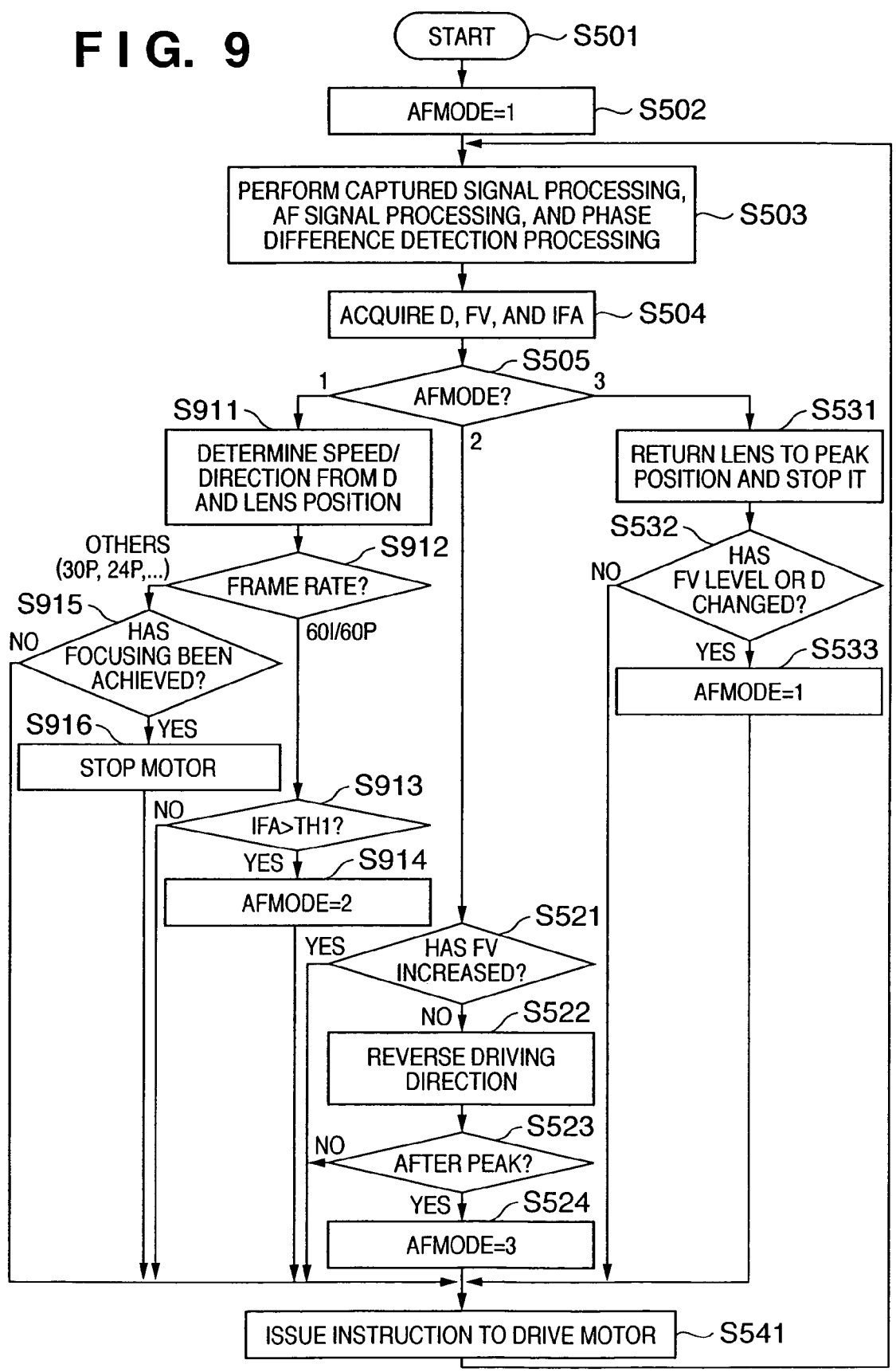
FIG. 9 is a flowchart showing an algorithm in a focus control unit according to the third embodiment of the present invention.

An algorithm in the third embodiment of the present invention will be described next with reference to FIG. 9. Note that the same operations as in FIG. 5 are performed in steps denoted by the same reference symbols as in FIG. 9, and hence a description thereof will be omitted. In step S911, a lens driving direction and speed are determined on the basis of a distance signal D acquired in step S504 and the current position of a focus lens 231. That is, a direction and speed are determined such that the lens is driven at a high speed if the distance is large in the direction in which the lens approaches the position of the distance signal D, and is driven at a low speed if the distance is small. If the distance signal D coincides with the current lens position, since the in-focus point is obtained it is determined that lens driving is stopped.

In step S912, the frame rate of the current captured signal is checked. If the frame rate is high, e.g., 60I or 60P, the flow advances to step S913. If the frame rate is extremely low, e.g., 30P, 24P, 15P, 10P, 5P, or slow-shutter image capturing, the flow advances to step S915 to determine whether focusing has been achieved. If NO in step S915, the flow advances to step S541 to continue the operation while AFMODE is 1. If it is determined that focusing has been achieved, the flow advances to step S916 to stop the motor. The flow then advances to step S541. In this case as well, the operation is continued while AFMODE is 1. In step S913, the IFA level acquired in step S504 is compared with a threshold TH1. If the level is equal to or lower than TH1, the flow advances to step S541. If the level is higher than TH1, since it indicates that the lens is located near the in-focus position, 2 is assigned to AFMODE in step S914. The flow then advances to step S541. In step S541, the lens is driven at the determined motor speed and in the determined direction. The flow then advances to step S503 to subsequently repeat the above processing in synchronism with the read cycle (captured signal processing cycle) of the image capturing device.

Fourth Embodiment

The fourth embodiment of the present invention will be described next.

The fourth embodiment of the present invention exemplifies another form of the method of generating an IFA signal used to discriminate a focusing degree in the first to third embodiments.

Figure 10:
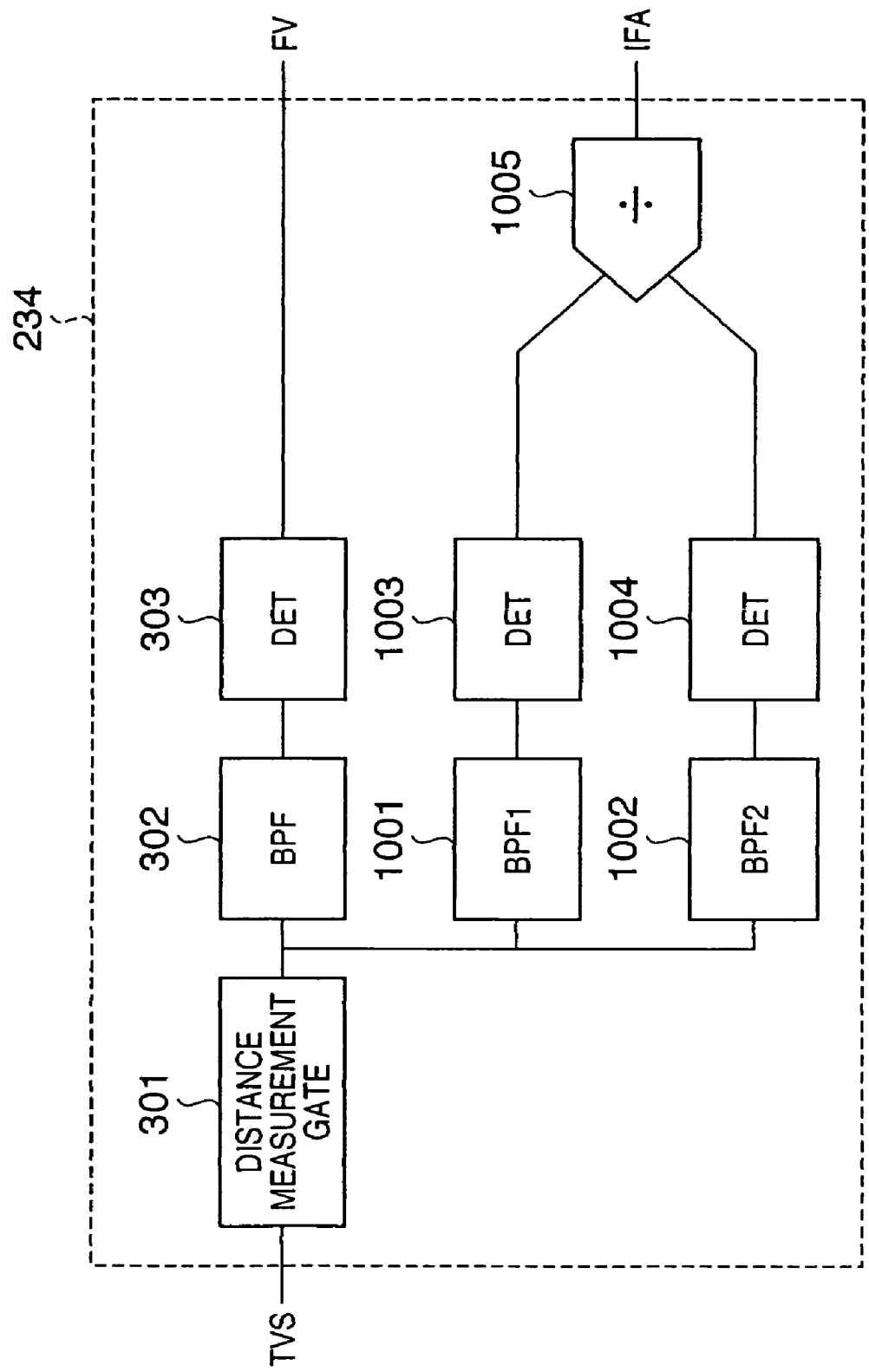
FIG. 10 is a block diagram for explaining the contents of the fourth embodiment of an AF signal processing unit 234 in FIG. 2.

FIG. 10 is a block diagram for explaining the contents of the fourth embodiment of the AF signal processing unit 234 in FIG. 2. One or a plurality of distance measurement gates 301 extract a captured signal from only part of the frame of a captured signal TVS from a captured signal processing unit 242. A bandpass filter (BPF) 302 extracts only a predetermined high frequency component from the captured signal. A detector 303 performs detection processing such as peak holding and integration for the resultant signal to output a captured signal AF evaluation value FV, and outputs it to a focus control unit 233. The above operation is the same as that in the first embodiment.

A bandpass filter 1 (BPF 1) 1002 and bandpass filter 2 (BPF 2) 1002 each extract only a predetermined high frequency component from the captured signal TVS passing through the distance measurement gate 301. Detectors 1003 and 1004 perform detection processing such as peak holding and integration for the signals. A divider 1005 obtains BPF1/BPF2 to calculate a focusing degree IFA for each measurement frame.

A frequency characteristic is selected for the BPF 1 such that the BPF 1 extracts a frequency component higher than that extracted by the BPF 2. If there are a plurality of distance measurement gates 301, a plurality of circuits follow them, and a plurality of AF evaluation values FV/focusing degrees IFA are obtained. The focus control unit 233 selects a signal from a plurality of signals in accordance with conditions, and performs autofocus operation on the basis of a plurality of signals. An algorithm using FV, IFA, and D is the same as that in the first to third embodiments, and hence a description thereof will be omitted.

Fifth Embodiment

The fifth embodiment of the present invention will be described next.

The fifth embodiment exemplifies still another form of the method of generating an IFA signal used to discriminate a focusing degree in the first to third embodiments.

Figure 11:
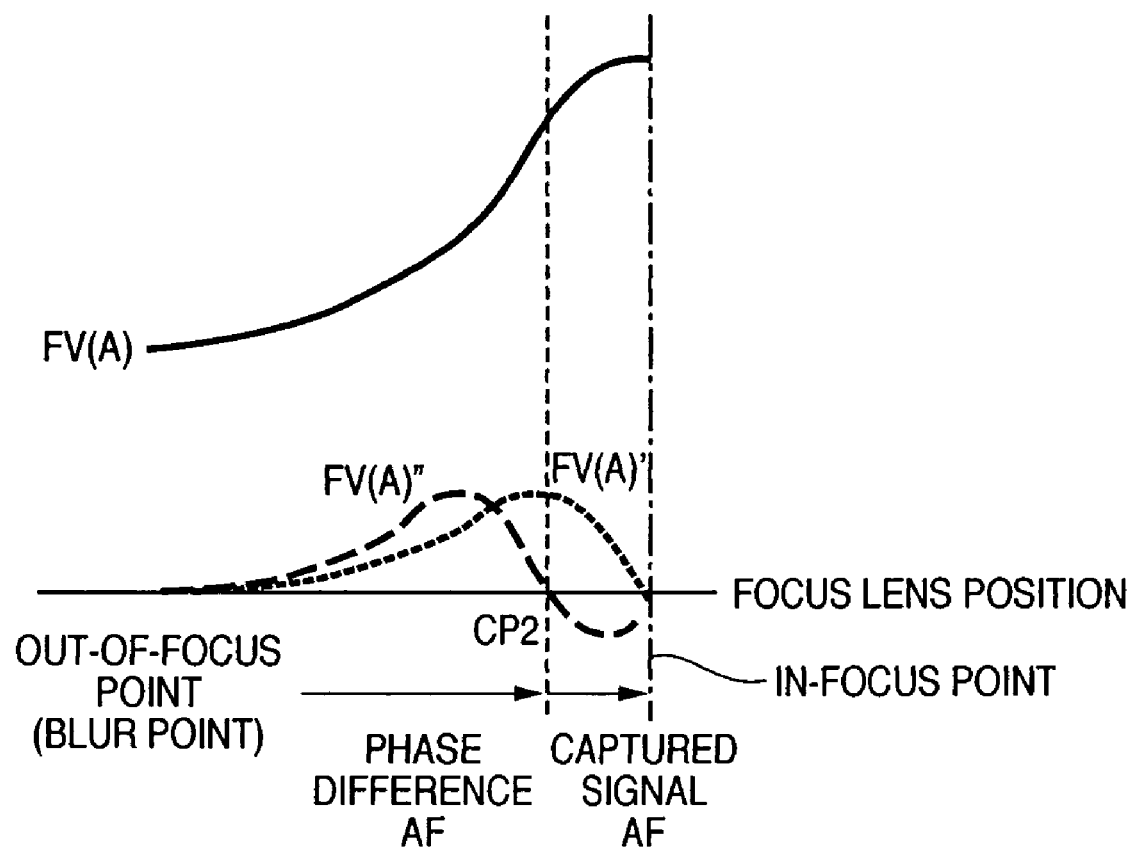
FIG. 11 is a graph showing an example of how a focusing degree signal IFA is generated in the fifth embodiment of the present invention.

The fifth embodiment exemplifies a case wherein a focusing degree IFA is generated from FV. Referring to FIG. 11, FV(A) represents changes from an out-of-focus state (blur state) of an object A to an in-focus state, and FV(A)' is obtained by differentiating the changes, which changes to 0 at an in-focus point. In addition, FA(A)" is obtained by further differentiation, which becomes 0 at both CP2 and an in-focus point. Switching is performed by using this characteristic, i.e., changing to 0 at CP2, such that AF is performed by using externally measured phase difference AF up to CP2 and by suing captured signal AF from CP2 to the in-focus point. That is, the sign of FV(A)" is used as a focusing degree IFA. An algorithm in this embodiment is the same as that in the first to third embodiments except that the IFA discrimination method is performed by comparison based on the sign of FV(A)" instead of comparison with TH1, and hence a description thereof will be omitted.

Sixth Embodiment

The sixth embodiment of the present invention will be described next.

In the sixth embodiment, a distance signal D output from an externally measured phase difference detection unit 230 is used in place of the IFA signal used to discriminate a focusing degree in the first embodiment.

Figure 12:
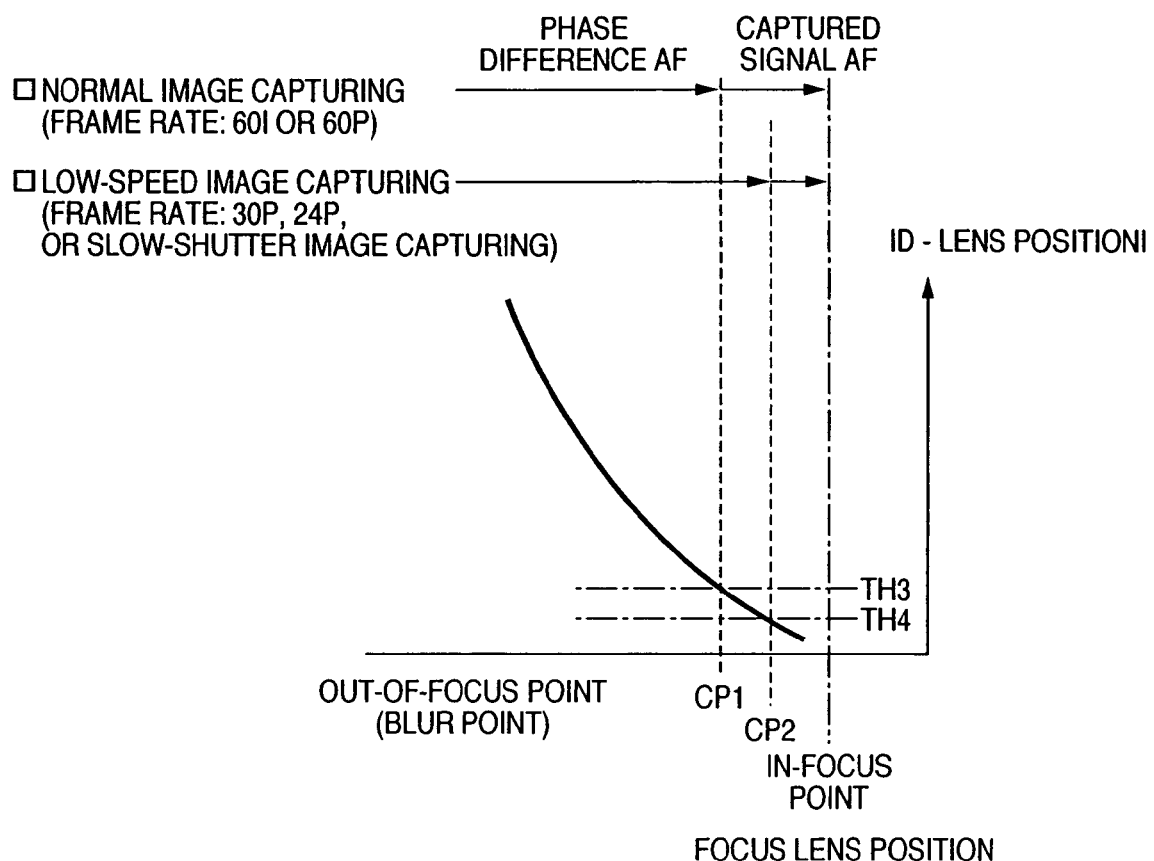
FIG. 12 is a graph for explaining a reference signal for switching focus detection devices in the sixth embodiment of the present invention.

In this embodiment, a focusing degree is obtained by the absolute value of the difference between a distance signal D and an object distance at a focus lens position in place of IFA. Referring to FIG. 12, the ordinate represents the focusing degree; and the abscissa, the focus lens position. When a captured signal is in a normal image capturing state (the frame rate or field rate is about 60/sec), switching from external distance measurement AF to captured signal AF according to TH3 makes it possible to smoothly switch from phase difference detection AF to captured signal AF, thereby quickly reaching an in-focus point with captured signal AF.

Assume that the frame rate of a captured signal is low (30P, 24P, slow-shutter image capturing, or the like). In this case, in order to quickly reach an in-focus point, since the control speed in captured signal AF is low, switching operation must be done at a position nearer to the in-focus point. If, therefore, the frame rate is low, TH4 is used to switch from external distance measurement AF to captured signal AF. This makes it possible to smoothly and quickly reach the in-focus point as in the case wherein the frame rate is high.

Obviously, the focusing degree in this embodiment can be used in the same manner in place of IFA in the second and third embodiments.

Lastly, in the first to sixth embodiments, as an example of direct distance measurement AF of directly measuring a distance, externally measured phase difference detection has been described. Obviously, however, TTL phase difference detection may be used. Alternatively, infrared AF may be used, in which the distance to an object is obtained according to the principle of triangular distance measurement by receiving infrared rays applied to the object.

In addition, normal image capturing is expressed as 60P or 60I, and image capturing with a low frame rate is expressed as 30P, 24P, 20P, 15P, 10P, or slow-shutter image capturing. However, they are only examples. Other frame rates may be used regardless whether interlaced or progressive scanning is used. In some cases, the number of frames per sec may not be an integer. In some areas, 60P or 60I is replaced by 50P or 50I, and 30P is replaced by 25P. In addition, for the sake of descriptive convenience, the embodiments have exemplified the case wherein two types of image capturing are switched between normal image capturing and image capturing with a low frame rate. However, a plurality of thresholds may be set for a plurality of types of image capturing in accordance with frame rates, or continuous thresholds may be set in accordance with frame rates.

According to the above embodiments, in the automatic focus detection device designed to specify true in-focus point by properly switching direct distance measurement AF and captured signal AF in the image capturing apparatus which can variably change the image capturing frame count/field count, a focusing degree is detected on the basis of captured signal or direct distance measurement AF, and direct measurement distance AF is switched to captured signal AF on the basis of the image capturing frame count or field count and the focusing degree. This makes it possible to guide the lens to the in-focus point by smoothly and quickly switching from direct distance measurement AF to captured signal AF with respect to all kinds of objects, regardless of how an image capturing frame count or image capturing field count is set in accordance with an image capturing purpose, under any image capturing conditions including them.

In addition, when a predetermined image capturing frame count or field count is set, a true in-focus point is specified by captured signal AF after the optical system is focused by a direct distance measurement AF device. This makes it possible to guide the lens to the in-focus point by smoothly and quickly switching from direct distance measurement AF to captured signal AF with respect to all kinds of objects even under image capturing conditions disadvantageous for captured signal AF.

Furthermore, when a predetermined image capturing frame count or field count is set, an in-focus point is specified by only a direct distance measurement AF device. This makes it possible to guide the lens to the in-focus point by smoothly and quickly switching from direct distance measurement AF to captured signal AF with respect to all kinds of objects even under image capturing conditions disadvantageous for captured signal AF.

According to the above embodiments, focus detection methods using a plurality of focus detection devices are switched in accordance with the output intervals of captured signals output by an image capturing device per unit time. Even if, therefore, the image capturing frame count or image capturing field count changes in accordance with the image capturing purpose, the focus detection devices can be smoothly and quickly switched.

The object of the present invention is realized even by supplying a storage medium recording software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the program codes themselves and the storage medium storing the program codes constitute the present invention.

As a storage medium for supplying the program codes, a flexible disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-271718 filed Sep. 17, 2004, which is hereby incorporated by reference herein.

What is claimed is:
1. An image capturing apparatus comprising:
   an image capturing device which outputs a captured signal of an object on the basis of incident light;
   an output interval control device which variably controls output intervals of captured signals output by said image capturing device per unit time;
   a plurality of focus detection devices which detect a focus; and a control device which controls focus detection by said plurality of focus detection devices; and a focusing degree calculating device which calculates a focusing degree on the basis of a captured signal output from said image capturing device, wherein said plurality of focus detection devices include a first focus detection device performing a focus detection based on a distance measurement result and a second focus detection device performing a focus detection based on a high frequency component of a captured signal, wherein said control device compares a focusing degree calculated by said focusing degree calculating device with a predetermined focusing degree, and choosing a timing for switching from said first focus detection device to said second focus detection device in accordance with a comparison result, and wherein said control device sets a first predetermined focusing degree as a comparison target for a focusing degree calculated by said focusing degree calculating device when captured signal output intervals are first predetermined output intervals, and sets a second predetermined focusing degree nearer to an in-focus point than the first predetermined focusing degree as a comparison target for a focusing degree calculated by said focusing degree calculating device when captured signal output intervals are second predetermined output intervals longer than the first predetermined output intervals.

2. The apparatus according to claim 1, wherein when captured signal output intervals are second predetermined output intervals, said control device switches from said first focus detection device to said second focus detection device after a focus lens driving device which drives a focus lens drives the focus lens to an in-focus position detected by said first focus detection device.

3. The apparatus according to claim 1, wherein said focusing degree calculating device calculates a focusing degree associated with a captured signal output from said image capturing device on the basis of a maximum value and minimum value of luminance of the captured signal output from said image capturing device.

4. The apparatus according to claim 1, wherein said focusing degree calculating device includes a plurality of bandpass filters which extract different high frequency components from a captured signal output from said image capturing device, and calculates a focusing degree associated with the captured signal on the basis of the high frequency components extracted by said plurality of bandpass filters.

5. The apparatus according to claim 4, wherein said focusing degree calculating device calculates a focusing degree associated with the captured signal on the basis of a ratio between high frequency components respectively extracted by said plurality of bandpass filters.

6. The apparatus according to claim 1, wherein said focusing degree calculating device calculates a focusing degree associated with the captured signal on the basis of a value obtained by second derivative calculation of a high frequency component of a captured signal output from said image capturing device.

7. The apparatus according to claim 1, wherein said focusing degree calculating device calculates a focusing degree associated with the captured signal on the basis of a distance measurement result at the time of image capturing of the captured signal.

8. A control method for an image capturing apparatus including an image capturing device which outputs a captured signal of an object on the basis of incident light, and a plurality of focus detection devices which detect a focus state, comprising:

an output interval control step of variably controlling output intervals of captured signals output by the image capturing device per unit time; and a control step of controlling focus detection by said plurality of focus detection devices; and a focusing degree calculating step of calculating a focusing degree on the basis of a captured signal output from said image capturing device, wherein said plurality of focus detection devices include a first focus detection device performing a focus detection based on a distance measurement result and a second focus detection device performing a focus detection based on a high frequency component of a captured signal, wherein said control step compares a focusing degree calculated by said focusing degree calculating step with a predetermined focusing degree, and chooses a timing for switching from said first focus detection device to said second focus detection device in accordance with a comparison result, and wherein said control step sets a first predetermined focusing degree as a comparison target for a focusing degree calculated by said focusing degree calculating step when captured signal output intervals are first predetermined output intervals, and sets a second predetermined focusing degree nearer to an in-focus point than the first predetermined focusing degree as a comparison target for a focusing degree calculated by said focusing degree calculating step when captured signal output intervals are second predetermined output intervals longer than the first predetermined output intervals.

9. A program stored on a computable-readable recording medium characterized by causing a computer to execute a control method for an image capturing apparatus defined in claim 8.

* * * * *